(12) United States Patent  
Tiana et al.

(10) Patent No.: US 8,917,191 B1
(45) Date of Patent: Dec. 23, 2014

(54) DUAL THREADED SYSTEM FOR LOW VISIBILITY OPERATIONS

(75) Inventors: Carlo L. Tiana, Portland, OR (US); Kenneth A. Zimmerman, Sherwood, OR (US); Robert B. Wood, Beaverton, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 534 days.

(21) Appl. No.: 13/241,051

(22) Filed: Sep. 22, 2011

(51) Int. Cl.
*G08B 21/00* (2006.01)

(52) U.S. Cl.
USPC ........... 340/945; 340/947; 340/951; 340/953; 340/972; 340/980; 701/14; 701/16; 701/18; 701/120

(58) Field of Classification Search
CPC .................... B64D 45/0015; B64D 2045/0045; G08G 5/0013; G08G 5/0021; G01C 23/00
USPC ......... 340/945, 947, 948, 951, 953, 954, 980, 340/956, 971, 972, 973, 974, 975; 701/14, 701/120; 348/144; 345/1.1; 250/330
See application file for complete search history.

(56) References Cited

U.S. PATENT DOCUMENTS

| | | | |
|---|---|---|---|
| 4,914,436 A | 4/1990 | Bateman et al. | |
| 5,047,779 A | 9/1991 | Hager | |
| 5,839,080 A | 11/1998 | Muller et al. | |
| 5,920,276 A | 7/1999 | Frederick | |
| 5,945,926 A | 8/1999 | Ammar et al. | |
| 5,978,715 A | 11/1999 | Briffe et al. | |
| 6,064,942 A | 5/2000 | Johnson et al. | |
| 6,092,009 A | 7/2000 | Glover | |
| 6,112,141 A * | 8/2000 | Briffe et al. | 701/14 |
| 6,112,570 A | 9/2000 | Hruschak | |

(Continued)

FOREIGN PATENT DOCUMENTS

| | | |
|---|---|---|
| DE | 196 49 838 | 4/1998 |
| DE | 19649838 | 4/1998 |

OTHER PUBLICATIONS

U.S. Appl. No. 13/194,594, filed Jul. 29, 2011, Lahr et al.

(Continued)

*Primary Examiner* — Steven Lim
*Assistant Examiner* — Sisay Yacob
(74) *Attorney, Agent, or Firm* — Angel N. Gerdzhikov; Donna P. Suchy; Daniel M. Barbieri (57) ABSTRACT

A system for controlling an image displayed on a display unit of an aircraft is shown and described. The system includes an enhanced vision system that detects elements of an approach lighting system for display on the display unit. The system also includes a synthetic vision system that uses a database of navigation information and a determined aircraft location to generate synthetic display elements representing the approach lighting system. Display electronics of the system cause the detected elements from the enhanced vision system to be simultaneously displayed on the display unit within a same scene as the generated synthetic display elements from the synthetic vision system. Advantageously, the simultaneous display allows a pilot viewing the display unit to check for whether information provided by the enhanced vision system matches information provided by the synthetic vision system.

19 Claims, 4 Drawing Sheets

(56) References Cited

U.S. PATENT DOCUMENTS

| | | | |
|---|---|---|---|
| 6,122,570 A | 9/2000 | Muller et al. |
| 6,128,553 A | 10/2000 | Gordon et al. |
| 6,138,060 A | 10/2000 | Conner et al. |
| 6,150,901 A | 11/2000 | Auken |
| 6,154,151 A | 11/2000 | McElreath et al. |
| 6,163,021 A | 12/2000 | Mickelson |
| 6,166,661 A | 12/2000 | Anderson et al. |
| 6,169,770 B1 | 1/2001 | Henely |
| 6,178,391 B1 | 1/2001 | Anderson et al. |
| 6,194,980 B1 | 2/2001 | Thon |
| 6,199,008 B1 | 3/2001 | Aratow et al. |
| 6,201,494 B1 | 3/2001 | Kronfeld |
| 6,219,592 B1 | 4/2001 | Muller et al. |
| 6,233,522 B1 | 5/2001 | Morici |
| 6,259,400 B1 | 7/2001 | Higgins et al. |
| 6,266,114 B1 | 7/2001 | Skarohlid |
| 6,281,832 B1 | 8/2001 | McElreath |
| 6,285,298 B1 | 9/2001 | Gordon |
| 6,285,337 B1 | 9/2001 | West et al. |
| 6,285,926 B1 | 9/2001 | Weiler et al. |
| 6,289,277 B1 | 9/2001 | Feyereisen et al. |
| 6,311,108 B1 | 10/2001 | Ammar et al. |
| 6,317,468 B1 | 11/2001 | Meyer |
| 6,345,127 B1 | 2/2002 | Mitchell |
| 6,377,892 B1 | 4/2002 | Johnson et al. |
| 6,388,607 B1 | 5/2002 | Woodell |
| 6,388,608 B1 | 5/2002 | Woodell et al. |
| 6,411,890 B1 * | 6/2002 | Zimmerman ............... 701/120 |
| 6,421,603 B1 | 7/2002 | Pratt et al. |
| 6,424,288 B1 | 7/2002 | Woodell |
| 6,426,717 B1 | 7/2002 | Maloratsky |
| 6,441,773 B1 | 8/2002 | Kelly et al. |
| 6,448,922 B1 | 9/2002 | Kelly |
| 6,452,511 B1 | 9/2002 | Kelly et al. |
| 6,456,236 B1 | 9/2002 | Hauck et al. |
| 6,473,240 B1 | 10/2002 | Dehmlow |
| 6,492,934 B1 | 12/2002 | Hwang et al. |
| 6,501,424 B1 | 12/2002 | Haendel et al. |
| 6,512,476 B1 | 1/2003 | Woodell |
| 6,525,674 B1 | 2/2003 | Kelly et al. |
| 6,531,669 B1 | 3/2003 | Miller et al. |
| 6,549,161 B1 | 4/2003 | Woodell |
| 6,567,728 B1 | 5/2003 | Kelly et al. |
| 6,574,030 B1 | 6/2003 | Mosier |
| 6,577,947 B1 | 6/2003 | Kronfeld et al. |
| 6,591,171 B1 | 7/2003 | Ammar et al. |
| 6,603,425 B1 | 8/2003 | Woodell |
| 6,650,275 B1 | 11/2003 | Kelly et al. |
| 6,653,947 B2 | 11/2003 | Dwyer et al. |
| 6,667,710 B2 | 12/2003 | Cornell et al. |
| 6,690,298 B1 | 2/2004 | Barber et al. |
| 6,690,299 B1 | 2/2004 | Suiter |
| 6,714,186 B1 | 3/2004 | Mosier et al. |
| 6,741,203 B1 | 5/2004 | Woodell |
| 6,741,208 B1 | 5/2004 | West et al. |
| 6,744,382 B1 | 6/2004 | Lapis et al. |
| 6,744,408 B1 | 6/2004 | Stockmaster |
| 6,757,624 B1 | 6/2004 | Hwang et al. |
| 6,771,626 B1 | 8/2004 | Golubiewski et al. |
| 6,804,614 B1 | 10/2004 | McGraw et al. |
| 6,806,846 B1 | 10/2004 | West |
| 6,819,983 B1 | 11/2004 | McGraw |
| 6,822,617 B1 | 11/2004 | Mather et al. |
| 6,839,017 B1 | 1/2005 | Dillman |
| 6,850,185 B1 | 2/2005 | Woodell |
| 6,862,501 B2 | 3/2005 | He |
| 6,865,452 B2 | 3/2005 | Burdon |
| 6,879,280 B1 | 4/2005 | Bull et al. |
| 6,882,302 B1 | 4/2005 | Woodell et al. |
| 6,918,134 B1 | 7/2005 | Sherlock et al. |
| 6,950,062 B1 | 9/2005 | Mather et al. |
| 6,972,727 B1 | 12/2005 | West et al. |
| 6,977,608 B1 | 12/2005 | Anderson et al. |
| 6,992,614 B1 | 1/2006 | Joyce |
| 6,995,726 B1 | 2/2006 | West et al. |
| 6,998,908 B1 | 2/2006 | Sternowski |
| 6,999,022 B1 | 2/2006 | Vesel et al. |
| 7,002,546 B1 | 2/2006 | Stuppi et al. |
| 7,034,753 B1 | 4/2006 | Elsallal et al. |
| 7,042,387 B2 | 5/2006 | Ridenour et al. |
| 7,064,680 B2 | 6/2006 | Reynolds et al. |
| 7,089,092 B1 | 8/2006 | Wood et al. |
| 7,092,645 B1 | 8/2006 | Sternowski |
| 7,109,912 B1 | 9/2006 | Paramore et al. |
| 7,109,913 B1 | 9/2006 | Paramore et al. |
| 7,129,885 B1 | 10/2006 | Woodell et al. |
| 7,145,501 B1 | 12/2006 | Manfred et al. |
| 7,148,816 B1 | 12/2006 | Carrico |
| 7,151,507 B1 | 12/2006 | Herting |
| 7,158,072 B1 | 1/2007 | Venkatachalam et al. |
| 7,161,525 B1 | 1/2007 | Finley et al. |
| 7,170,446 B1 | 1/2007 | West et al. |
| 7,196,329 B1 * | 3/2007 | Wood et al. ............... 250/330 |
| 7,205,933 B1 | 4/2007 | Snodgrass |
| 7,209,070 B2 | 4/2007 | Gilliland et al. |
| 7,219,011 B1 | 5/2007 | Barber |
| 7,242,343 B1 | 7/2007 | Woodell |
| 7,272,472 B1 | 9/2007 | McElreath |
| 7,292,178 B1 | 11/2007 | Woodell et al. |
| 7,312,725 B2 | 12/2007 | Berson et al. |
| 7,312,743 B2 | 12/2007 | Ridenour et al. |
| 7,486,291 B2 | 2/2009 | Berson et al. |
| 7,525,448 B1 | 4/2009 | Wilson et al. |
| 7,570,177 B2 | 8/2009 | Reynolds et al. |
| 7,633,430 B1 | 12/2009 | Wichgers et al. |
| 7,639,175 B1 | 12/2009 | Woodell |
| 7,664,601 B2 | 2/2010 | Daly, Jr. |
| 7,675,461 B1 | 3/2010 | McCusker et al. |
| 7,733,264 B1 | 6/2010 | Woodell et al. |
| 7,783,427 B1 | 8/2010 | Woodell et al. |
| 7,859,448 B1 | 12/2010 | Woodell et al. |
| 7,859,449 B1 | 12/2010 | Woodell et al. |
| 8,035,547 B1 | 10/2011 | Flanigan et al. |
| 8,373,580 B2 | 2/2013 | Bunch et al. |
| 8,493,241 B2 | 7/2013 | He |
| 2002/0185600 A1 * | 12/2002 | Kerr ............... 250/330 |
| 2003/0071828 A1 | 4/2003 | Wilkins et al. |
| 2003/0216859 A1 | 11/2003 | Martell et al. |
| 2004/0044445 A1 | 3/2004 | Burdon |
| 2004/0059473 A1 | 3/2004 | He |
| 2004/0083038 A1 | 4/2004 | He |
| 2004/0181318 A1 | 9/2004 | Redmond et al. |
| 2005/0174350 A1 | 8/2005 | Ridenour et al. |
| 2006/0097895 A1 | 5/2006 | Reynolds et al. |
| 2006/0227012 A1 | 10/2006 | He |
| 2006/0290531 A1 | 12/2006 | Reynolds et al. |
| 2007/0060063 A1 | 3/2007 | Wright et al. |
| 2008/0180351 A1 * | 7/2008 | He ............... 345/1.1 |
| 2009/0207048 A1 | 8/2009 | He et al. |
| 2010/0033499 A1 | 2/2010 | Gannon et al. |
| 2011/0282580 A1 | 11/2011 | Mohan |

OTHER PUBLICATIONS

Office Action on U.S. Appl. No. 13/247,742 Dated Dec. 3, 2013, 11 pages.

Fountain, J.R., Digital Terrain Systems, Airborne Navigation Systems Workshop (Digest No. 1997/169), IEE Colloquium, pp. 4/1-4/6, Feb. 21, 1997.

Honeywell, RDR-4B Forward looking windshear detection / weather radar system user's manual with radar operating guidelines, Rev. 6, Jul. 2003, 106 pages.

Johnson, A., et al., Vision Guided Landing of an Autonomous Helicopter in Hazardous Terrain, Robotics and Automation, 2005. ICRA 2005. Proceedings of the 2005 IEEE International Conference, pp. 3966-3971, Apr. 18-22, 2005.

Kuntman, D., Airborne system to address leading cause of injuries in non-fatal airline accidents, ICAO Journal, Mar. 2000, 4 pages.

Office Action for U.S. Appl. No. 11/851,323, mail date Jul. 5, 2012, 23 pages.

(56) References Cited

OTHER PUBLICATIONS

Office Action for U.S. Appl. No. 11/851,323), mail date Dec. 15, 2010, 13 pages.

Office Action for U.S. Appl. No. 11/851,323, mail date Aug. 6, 2009, 23 pages.

Technical Standard Order, TSO-C115b, Airborne Area Navigation Equipment Using Multi-Sensor Inputs, Sep. 30, 1994, 11 pages, Department of Transportation, Federal Aviation Administration, Washington, DC.

Vadlamani, A., et al., Improving the detection capability of spatial failure modes using downward-looking sensors in terrain database integrity monitors, Digital Avionics Systems Conference, 2003. DASC-03. The 22nd, vol. 2, pp. 9C.5-91-12 vol. 2, Oct. 12-16, 2003.

US Office Action on U.S. Appl. No. 13/247,742 Dated Apr. 16, 2014, 15 pages.

\* cited by examiner

DUAL THREADED SYSTEM FOR LOW VISIBILITY OPERATIONS

BACKGROUND

The present invention relates generally to the field of aircraft navigation. The present invention more particularly relates to the fields of aircraft navigation systems and display features. While the present invention particularly relates to the fields of aircraft navigation systems and display features, applications could also include marine and terrestrial navigation systems.

Current enhanced vision systems (EVS) are being certified to extend certain non-precision and Category I (CAT I) operations through utilization of enhanced vision systems (EVS) as a supplement to natural vision. For example, CAT I conditions, at most, only allow descent to 200 ft. HAT before a go-around decision is made if the airport environment is not visually acquired by the crew. For example, with an EVS equipped and certified aircraft, credit is given for the EVS system, so that, in some conditions, if the crew 'sees' the airport environment using the enhanced vision system's output, then the approach can proceed down to 100' HAT before natural vision must acquire the airport environment in order to continue the approach.

Normally, low visibility operations (such as those described above and provided by EVS) beyond CAT I conditions impose higher demands on the reliability, availability and failure modes of the system being relied upon to perform those operations. These more stringent requirements are typically addressed through system redundancy and/or high design assurance levels. Both solutions come at considerable costs.

What is needed are systems and methods for providing higher EVS/SVS integrity without dramatically increasing costs. Higher integrity may advantageously allow special authorization credit even if the EVS does not meet expensive high design assurance levels.

SUMMARY

One embodiment of the invention relates to a system for controlling an image displayed on a display unit of an aircraft. The system includes an enhanced vision system that, among other scene features, detects elements of an approach lighting system and provides the detected elements for display on the display unit. The system also includes a synthetic vision system that uses a database of navigation information and a determined aircraft location to generate synthetic display elements representing the approach lighting system. Display electronics of the system cause the detected elements from the enhanced vision system to be simultaneously displayed on the display unit within a same scene as the generated synthetic display elements from the synthetic vision system. Advantageously, the simultaneous display allows a pilot viewing the display unit to check for whether information provided by the enhanced vision system matches information provided by the synthetic vision system.

Another embodiment of the invention relates to a method for controlling an image displayed on a display unit of an aircraft. The method includes using an enhanced vision system to detect and optionally enhance elements of an approach lighting system for display on a scene of a display unit. The method further includes using a synthetic vision system and the synthetic vision system's database of navigation information to generate synthetic display elements representing the approach lighting system. The method also includes causing the detected elements from the enhanced vision system to be simultaneously displayed on the display unit within the same scene as the generated synthetic display elements from the synthetic vision system. The synthetic vision system and the enhanced vision system may determine placement of their respective elements on the display unit independently. The synthetic vision system may cause its generated synthetic display elements to be positioned on the scene of the display unit based on aircraft position information and aircraft orientation information obtained from a first set of sensors. In some embodiments, the method may further include using a comparator to automatically compare the graphical distance between the enhanced elements from the enhanced vision system and the generated synthetic display elements from the synthetic vision system. The method may also include causing an indication of a degree of alignment of the enhanced elements and the corresponding elements on the generated synthetic display to be output.

Another embodiment of the invention relates to computer-readable media including computer executable instructions for completing the following steps: using an enhanced vision system to detect and enhance elements of an approach lighting system for display on a scene of a display unit; using a synthetic vision system and the synthetic vision system's database of navigation information to generate synthetic display elements representing the approach lighting system; and causing the enhanced elements from the enhanced vision system to be simultaneously displayed on the display unit within the same scene as the generated synthetic display elements from the synthetic vision system.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Before turning to the Figures, which illustrate the exemplary embodiments in detail, it should be understood that the disclosure is not limited to the details or methodology set forth in the description or illustrated in the Figures. It should also be understood that the terminology is for the purpose of description only and should not be regarded as limiting.

Referring generally to the Figures, systems and methods for controlling an image displayed on a display unit of an aircraft are shown and described. The system includes an enhanced vision system that detects elements of an approach lighting system and enhances the detected elements for display on the display unit. The system also includes a synthetic vision system that uses a database of navigation information and a determined aircraft location to generate synthetic display elements representing the approach lighting system. Display electronics of the system cause the enhanced elements from the enhanced vision system to be simultaneously displayed on the display unit within a same scene as the generated synthetic display elements from the synthetic vision system. Advantageously, the simultaneous display allows a pilot viewing the display unit to check for whether information provided by the enhanced vision system matches information provided by the synthetic vision system.

Figure 1:
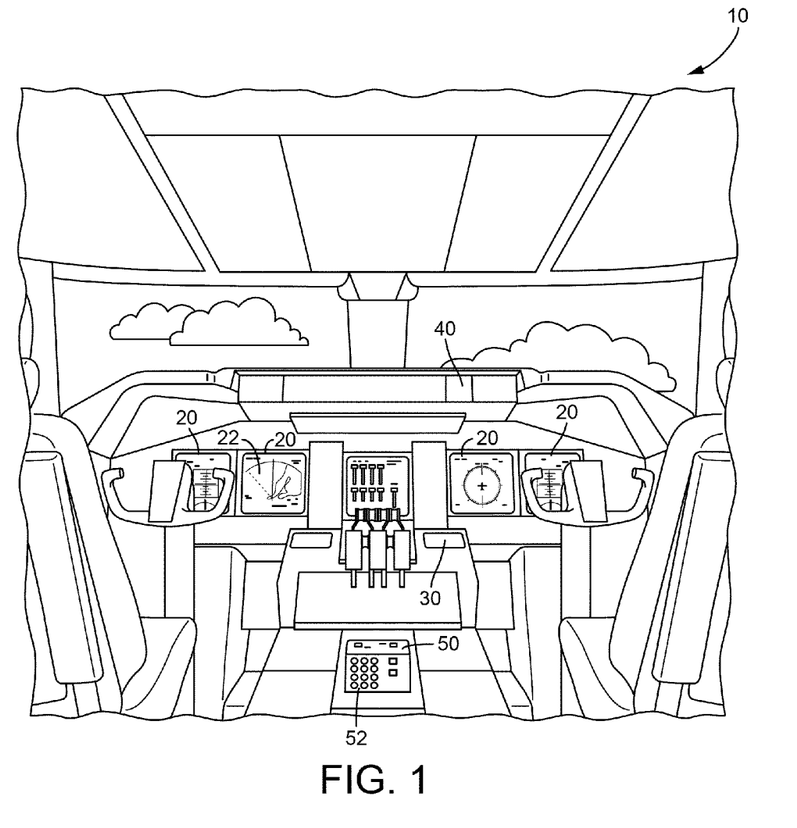
FIG. 1 is an illustration of an aircraft control center, according to an exemplary embodiment.

Referring to FIG. 1, an illustration of an aircraft control center or cockpit 10 is shown, according to an exemplary embodiment. Aircraft control center 10 includes flight displays 20 which are generally used to increase visual range and to enhance decision-making abilities. In an exemplary embodiment, flight displays 20 may provide an output from navigation, communications, and/or radar systems of the aircraft. In an exemplary embodiment, flight displays 20 may provide a top-down view, a horizontal view, or any other view of airport features, weather and/or terrain detected or estimated by the aircraft systems. The views may be monochrome or color graphical representations. Graphical representations may include an indication of altitude of detected objects or the altitude relative to the aircraft. Flight displays 20 may include a touch sensitive surface 22 configured to receive touch gestures relative to the images shown on display 20. Aircraft control center 10 may further include other user interface elements such as an audio input/output device 30 (e.g., speaker, electro-acoustic transducer, voice command recognition device, etc.), illuminating or flashing lamps 40, and a cursor control device 50. Cursor control device 50 may include knobs and buttons configured to move a cursor on display 20, navigate through lists of information, and to make selections. The buttons of cursor control device 50 may include a keypad 52 configured to enable a user to type information for entry into the processing electronics system, for example, to enter latitudinal and longitudinal coordinates.

Figure 2:
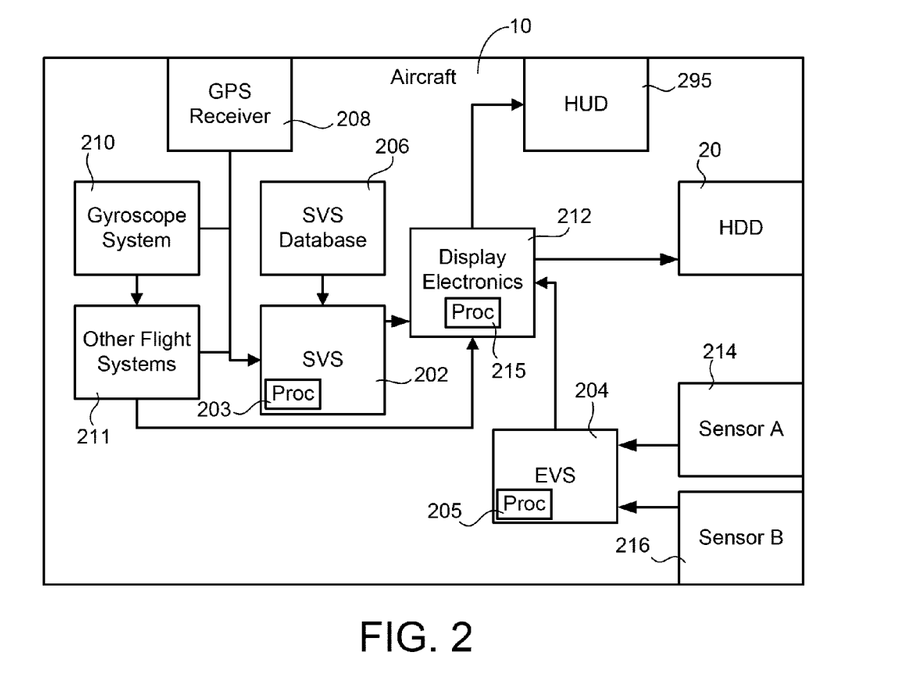
FIG. 2 is a block diagram of a system for controlling an image displayed on a display unit of an aircraft.

Referring now to FIG. 2, a block diagram of an aircraft is shown to include aircraft control center 10 (e.g., of FIG. 1). The aircraft of FIG. 2 includes a synthetic vision system 202 and an enhanced vision system 204. Synthetic vision system 202 uses a database of navigation information 206 and a determined aircraft location (e.g., derived using GPS receiver 208, gyroscope system 210, and/or flight systems 211) to generate synthetic display elements representing terrain, weather, or aircraft features (e.g., such as features of an approach lighting system). Enhanced vision system 204 uses forward-looking sensors 214, 216 to detect elements for display (e.g., lights of an approach lighting system). The enhanced vision system 204 can prepare (e.g., enhance, extract, filter, prepare for direct pass-through) detected elements for display on a display unit 20 and/or head-up display 295. Display electronics 212 receive outputs from synthetic vision system 202 and enhanced vision system 204. The display electronics are configured to cause enhanced elements from the enhanced vision system to be simultaneously displayed on a display unit (e.g., one of display 20, display 295) within the same scene as generated synthetic display elements from the synthetic vision system. The simultaneous display may be conformal such that the elements from the EVS and the SVS are provided at the same magnification and/or general location such that direct visual comparison of the EVS and SVS scene is immediately possible. Advantageously, the simultaneous display is intended to allow a pilot viewing the display unit to check for whether information provided by the enhanced vision system matches information provided by the synthetic vision system. While EVS 204 may receive some information from other flight systems 211 (e.g., aircraft orientation information), in other embodiments the positions of the SVS and EVS elements on the display are completely independently derived with no common points of failure.

In conventional systems, low visibility operations beyond CAT I conditions impose higher demands on the reliability, availability and failure modes of the system being relied upon to perform these operations. These more stringent requirements are typically addressed through system redundancy and/or high design assurance levels. Both solutions come at considerable cost.

Embodiments of the systems and methods described herein utilize selected features of the enhanced vision system 204 together with features of the synthetic vision system 202 to provide two independent information threads to a displayed scene. If both systems are already installed on the aircraft, the display electronics or software thereof can advantageously provide the displayed scene without adding another set of vision sensors/electronics. Some enhanced vision systems excel at detecting elements of approach lighting systems (ALS) at or near published approach minima. Synthetic vision system databases contain information for rendering the ALS. Using exemplary embodiments described herein, a "decluttered" or basic synthetic vision system image of a runway or runway features (i.e., an iconic depiction of the location of ALS light sources, a graphical depiction of an extended runway centerline, a graphical depiction of a runway outline, etc.) can be generated by the synthetic vision system and displayed with an enhanced vision system depiction of the same approach features. For example, some embodiments of the present disclosure may overlay a synthetic vision system scene on an enhanced vision system scene. A pilot using embodiments of the present disclosure can readily confirm that the two disparate information sources are providing coherent information. If the two disparate information sources are providing coherent information, it is likely that the information is accurate, allowing the pilot to confirm the integrity of the system and to proceed with the approach in accordance with prescribed parameters. In some countries, airport/aircraft regulations may be revised to allow an approach with pilot-confirmed "dual threaded" information source conformity to descend to a lower altitude before visual aircraft environment acquisition is required. Exemplary systems and methods of the present application advantageously improve an aircraft operational envelope in low visibility conditions without the need to deploy expensive conventional "high-integrity" systems.

In an exemplary embodiment, the synthetic vision system 202 and the enhanced vision system 204 determine placement on a shared scene of a display unit independently. For example, the synthetic vision system 204 can be configured to cause its generated synthetic display elements to be positioned on the scene of the display unit based on aircraft position information and aircraft orientation information obtained from a first set of sensors. While the synthetic vision system 204 is causing its generated synthetic display elements to be positioned on a scene using a first set of sensors, the enhanced vision system causes its enhanced detected elements to be positioned in the scene of the display unit based on information from a second set of sensors. In some embodiments, the first set of sensors and the second set of sensors do not share any one sensor.

The synthetic display elements provided by information from the synthetic vision system may be generated using database information corresponding with the aircraft position information and the aircraft orientation information obtained from the first set of sensors. The aircraft position information may be derived from a satellite-based positioning system such as GPS or GNSS. With reference to FIG. 2, the synthetic vision system 202 can receive or determine aircraft position information from data received from GPS receiver 208. The aircraft orientation information may be received or determined using information from at least one gyroscope system 210. The generated synthetic display elements representing the approach lighting system may be or include icons for lights of the approach lighting system. The generated synthetic display elements may include a graphic representing an area of uncertainty around the display element representing the approach lighting system. The area of uncertainty may be static and represent an area of pre-calculated uncertainty corresponding with information from the synthetic vision system. In other embodiments, the area of uncertainty is dynamically calculated based on changing factors of the synthetic vision system. The display electronics 212 may be configured to cause the enhanced elements from the enhanced vision system 204 to overlay at least some of the generated synthetic display elements from the synthetic vision system 202.

Referring still to FIG. 2, the enhanced vision system ("EVS") 204 may provide a real-world image on display units 20, 295 of the scene in front of an aircraft. At least one sensor may be mounted on the aircraft for detecting infrared or visual light emanating from the environment in front of the aircraft. The sensor may be a camera configured to detect visible wavelengths, infrared wavelengths, near-infrared radiation, radio-frequency wavelengths (such as millimeter-wave RADAR), or a combination thereof. While two sensors 214, 216 are shown as providing information to EVS 204, in some embodiments only a single sensor or camera may provide images to EVS 204. In other embodiments, additional sensors may be provided beyond sensors 214, 216. EVS 204 and processor 205 may be configured to prepare enhanced image data received from the sensors 214, 216 for subsequent processing, for example, by display electronics 212.

The SVS 202 includes or is coupled to an SVS database 206 and a processor 203. The SVS database 206 may be or include a terrain database to create a three-dimensional perspective of the scene in front of the aircraft (e.g., on a two-dimensional display unit). In an exemplary embodiment, the SVS database 206 includes information regarding approach lighting systems for a plurality of airports. The SVS database 206 may also include terrain information. Accordingly, the SVS 202 may provide a computer-generated scene including synthetic display elements of an approach lighting system and terrain surrounding the approach lighting system. The terrain surrounding the approach lighting system may include an outline of significant terrain aspects as well as a computer-generated representation of the runway or other airport structures. Using SVS 202, the aircraft can provide the pilot with a computer-generated approximation of an approach scene even if visibility of the actual scene may be limited or obscured (e.g., by smoke, sand, fog, clouds, rain, snow, etc.).

SVS 202 generally, and SVS processor 203 more particularly, may be programmed to receive aircraft position information from the GPS receiver 208 as input. While a GPS receiver 208 is shown as coupled to SVS 202 in FIG. 2, in varying embodiments a different navigation system may be used with SVS 202. A navigation system that provides position information to SVS 202 can include numerous subsystems including, e.g., an inertial guidance system, a global navigation satellite system other than GPS or in addition to GPS, a flight management computing system, or any combination thereof.

Processors 203 and 205 may be or include a microprocessor, microcontroller, application-specific integrated circuit (ASIC), or other circuitry configured to perform or support the processes described in the present application for each processor's respective parent circuits (e.g., SVS 202, EVS 204). SVS 202 and EVS 204 may be or include computer systems (e.g., embedded computer systems, real-time operating systems, etc.) that use their respective processors 203, 205 to receive inputs, analyze the inputs, and to generate and output appropriate outputs. The I/O devices shown in FIG. 1 can be communicably connected to the components of FIG. 2. For clarity, not all such connection lines or I/O devices (e.g., a keypad) are shown in FIG. 2. Each of the aircraft's components of FIG. 2 may include input/output interfaces for receiving appropriate I/O wires or communication busses. The input/output interfaces (which may be represented in FIG. 2 by the intersection of the illustrated communication lines and the block boundaries) may include appropriate jacks, terminals, transceivers, ports, filters, or any other suitable hardware for sending or receiving a communication signal on a wire or communication line. While FIG. 2 illustrates connections as being wired, any of the connections may be wireless (e.g., optical, RF, etc.) or include wireless components.

SVS 202 and EVS 204 may include memory devices (e.g., RAM, ROM, Flash memory, hard disk storage, etc.) for storing data and/or computer code for completing and/or facilitating the various processes described in the present disclosure. The memory devices may be or include volatile memory or non-volatile memory. The memory devices may include database components, object code components, script components, or any other type of information structure for supporting the various activities and information structures of the present disclosure. The memory devices may also or alternatively be configured to store buffered or generated images (e.g., bitmaps, compressed images, video data, etc.) for outputting to display electronics 212. In other embodiments, generated enhanced vision elements or generated synthetic vision elements are created and output from SVS 202, 204 in a non-image form for parsing by display electronics 212. For example, SVS 202 may send a mark-up language description of objects for display to display electronics 212. Display electronics 212 may parse the mark-up language and generate display objects/content based on the mark-up language. SVS 202, EVS 204, processor 203, and processor 205 may each include memory having computer code for execution by a processing circuit (e.g., processor 203, processor 205, another processor of SVS 202, EVS 204).

HUD 295 may be a head-up display of any suitable technology of the past, present, or future. In an exemplary embodiment, HUD 295 may be a projection/combiner type HUD. Electronics for driving the HUD 295 may be a part of HUD 295, a part of display electronics 212, or distributed among HUD 295 and display electronics 212.

Head down display (HDD) 20 may be a cathode ray tube (CRT), LCD, OLED, or a display unit of another display technology. Electronics for driving the HDD 20 may be a part of HDD 20, a part of display electronics 212, or distributed among HDD 20 and display electronics 212.

Gyroscope system 210 may be or include any suitable gyroscope system for determining aircraft orientation information (e.g., tilt angle, yaw angle, pitch angle, etc.). Outputs from gyroscope system 210 may be provided directly to SVS 202, processed by other flight systems 211, or otherwise provided to the components of FIG. 2 for use in display activities.

The processor 215 of display electronics 212 may include or access a memory device of display electronics 212. The processor 215 may execute computer code stored in the memory device to complete the activities described herein with respect to the display electronics. In an exemplary embodiment, display electronics 212 uses a coupled memory device to buffer the enhanced detected elements received from the enhanced vision system and to buffer the synthetic display elements from the synthetic vision system. The display electronics 212 generally, and processor 215 more particularly, may then cause the elements to be shown on the same scene of one of the display units in the aircraft (e.g., one of displays 20, 295, etc.). One or more processing tasks may be conducted by processor 215 in order for the respective display elements of the SVS 202 and EVS 204 to be shown in the same scene. For example, display electronics 212 or its processor 215 may synchronize data received from SVS 202 and EVS 204 such at it the timing matches. In an exemplary embodiment, for example, display electronics 212 may provide a clock signal to the SVS 202 and its components and the same clock signal to the EVS 204 for use in synchronizing the SVS 202, EVS 204, and the display electronics 214.

Figure 3:
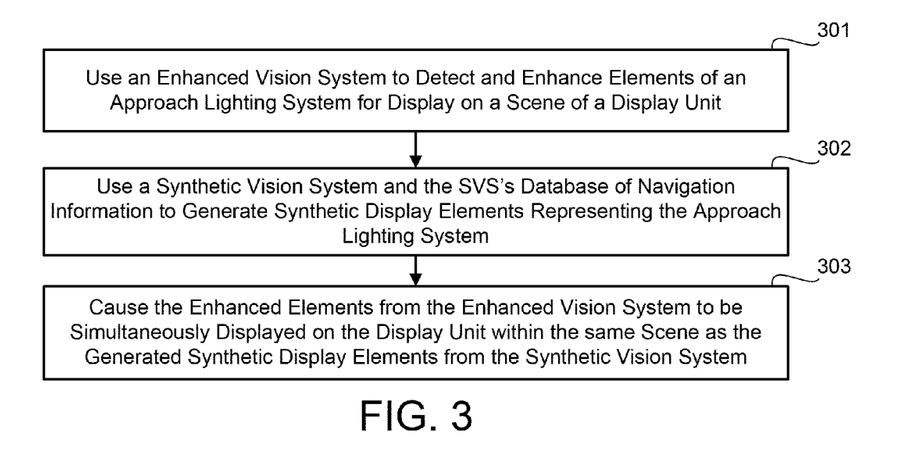
FIG. 3 is a flow chart of a process for controlling an image displayed on a display unit of an aircraft (e.g., using the system of FIG. 2)

Referring now to FIG. 3, and also continuing to refer to FIG. 2, a flow chart of a process for controlling an image displayed on a display unit of an aircraft is shown, according to an exemplary embodiment. The process is shown to include the step 301 of using an enhanced vision system (e.g., EVS 204 shown in FIG. 2) to detect and enhance elements of an approach lighting system for display on a scene of a display unit (e.g., one of display units 20, head-up display 295, etc.). The process of FIG. 3 is further shown to include using a synthetic vision system (e.g., SVS 202 shown in FIG. 2) and the SVS's database of navigation information (e.g., SVS database 206) to generate synthetic display elements representing the approach landing system (step 302). The process of FIG. 3 further includes causing the enhanced elements from the enhanced vision system to be simultaneously displayed on the display unit within the same scene as the generated synthetic display elements from the synthetic vision system (step 303).

FIGS. 4-7 are simplified drawings of display scenes for illustrating the process of FIG. 3, according to an exemplary embodiment.

Figure 4:
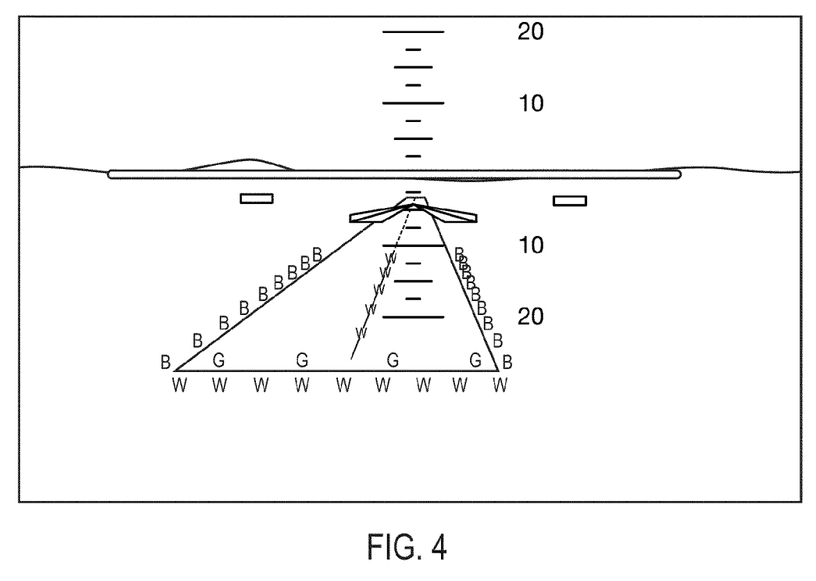
FIG. 4 is a simplified illustration of an output from a synthetic vision system of the present invention, according to an exemplary embodiment.

FIG. 4 illustrates exemplary output from a synthetic vision system that uses a database of navigation information and a determined aircraft location to generate a synthetic scene or graphical components for a synthetic scene. In the example of FIG. 4, navigation information is used to generate a synthetic horizon and landscape including a computer-generated runway. Using aircraft orientation and navigation information, the SVS generates a view using three-dimensional computer graphics that approximate important features that the pilot would see out the window if visibility were improved. In FIG. 4, in addition to a computer generated representation of the horizon, landscape, and runway, the SVS generated synthetic display elements representing the approach lighting system. In the example of FIG. 4, for example, the generated synthetic display elements of the approach lighting system are letter icons (e.g., B, W, G) identifying the location and color of the lights of the approach lighting system. The letter icons may be generated by recalling approach lighting system information from the SVS database. For example, the SVS database may include coordinate information for lights of a plurality of airports approach lighting systems. The information generated by SVS may be provided to display electronics for combining with information from the EVS. While the generated synthetic display elements representing the approach lighting system are shown as the letter icons in FIG. 4, it should be appreciated that other icons, indicators, symbols or graphics may be used in place of the letter icons in varying embodiments.

Figure 5:
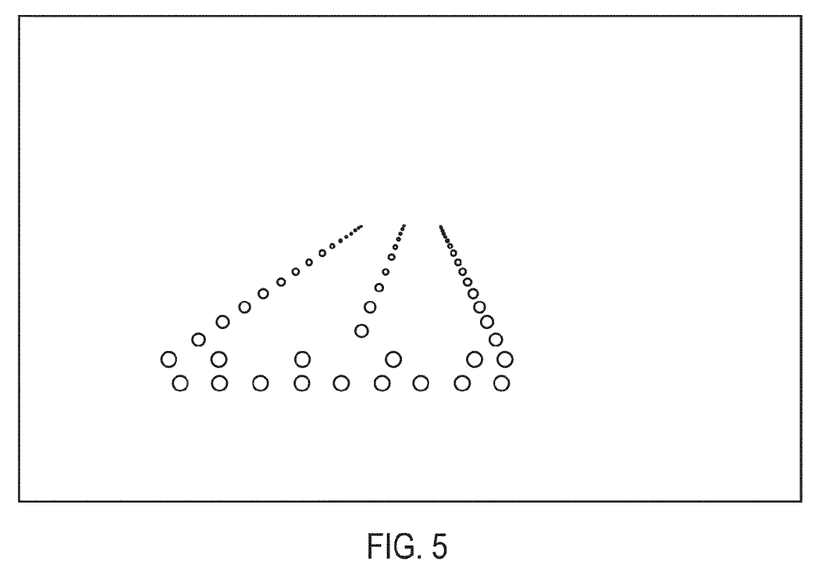
FIG. 5 is a simplified illustration of an output from an enhanced vision system of the present invention, according to an exemplary embodiment.

FIG. 5 illustrates exemplary output from an enhanced vision system. In the example of FIG. 5, a sensor (e.g., infrared sensor, visible light sensor, etc.) detects elements of an approach lighting system and enhances the detected elements for display. Enhancing the detected approach lighting system elements may include intensifying the detected lights and providing the intensified light video to a display unit. Enhancing the detected approach lighting system may include intensifying the light and drawing a circle around the intensified light. Depending on the wavelength filtering or other image processing applied to the sensor or camera, other elements of the scene may not be shown. While circles are shown as the enhancements of the detected elements of the approach lighting system in FIG. 5, it should be appreciated that other enhancements (e.g., filters, gain increases, symbols, etc.) may be used to enhance elements detected by an enhanced vision system.

Figure 6:
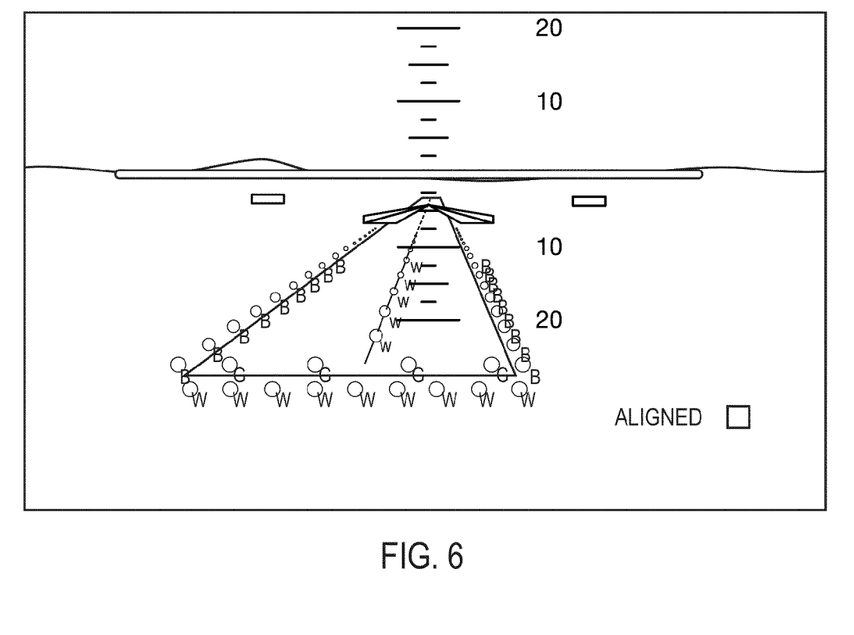
FIG. 6 is a simplified illustration of a scene output to a display unit, the scene created using the systems and methods of the present invention, according to an exemplary embodiment. The illustration of FIG. 6 shows SVS and EVS outputs that are not aligned.

FIG. 6 illustrates the result of simultaneously displaying the enhanced elements from the enhanced vision system (e.g., elements from the example of FIG. 5) and elements from the synthetic vision system (e.g., elements from the example of FIG. 4). As can be seen, the letter icons exist on the screen with the enhanced elements from the enhanced vision system. In an exemplary embodiment, the enhanced vision system and the synthetic vision system independently determine a proper location for their respective elements within the scene based on aircraft position/orientation information. A pilot may view the display unit having the simultaneous display of synthetic vision system elements and enhanced vision system elements to check for whether information provided by the enhanced vision system matches information provided by the synthetic vision system. If the information matches, the pilot may determine that he may descend further without visual confirmation of the approach lighting system, the runway, or the terrain. In the example shown in FIG. 6, the elements detected and enhanced by the enhanced vision system do not align with the simultaneously displayed elements from the synthetic vision system. In this example, the pilot may determine that he cannot trust the integrity of either system (SVS or EVS) to a high degree, and may determine to go-around or land at another airport.

While the EVS and SVS elements are detected or generated independently, a process may run (e.g., on the display electronics) that estimates whether the elements are aligned. If the elements are aligned, the display electronics may output an indication of the alignment determination. For example, the display electronics may determine whether or not to populate a check box that indicates whether the SVS and EVS elements are aligned. In the Example of FIG. 6, the "aligned" checkbox is empty. Such a feature may be implemented by display electronics that include a comparator. The comparator may be configured to automatically compare the graphical distance between the enhanced elements from the enhanced vision system and the generated synthetic display elements from the synthetic vision system. The comparator can cause an indication of a degree of alignment of the enhanced elements and corresponding elements on the generated synthetic display. Either the EVS or the SVS may be associated with known or estimated noise or imprecision. The display electronics (or the EVS or the SVS) may be configured to estimate and draw a circle of confusion around EVS elements, SVS elements, or both to represent estimated uncertainties in the positioning on the display scene. This circle of confusion may be dynamically calculated or static. Accordingly, using the dual threads of information provided by the EVS and SVS graphics coupled with drawn circles (or other indicators, e.g., boxes) of confusion, the pilot may quickly visually gauge the level of confidence that can be given to his aircraft's EVS and SVS systems.

Figure 7:
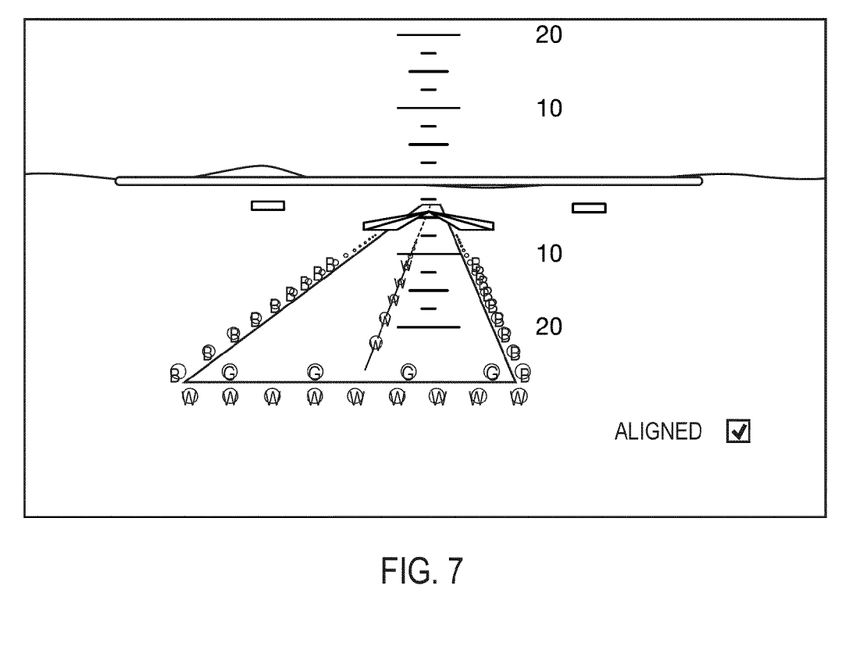
FIG. 7 is a simplified illustration of a scene output to a display unit, the scene created using the systems and methods of the present invention, according to an exemplary embodiment. The illustration of FIG. 7 shows SVS and EVS outputs that are aligned.

In FIG. 7, the generated SVS elements and the generated EVS elements are shown as aligned. Accordingly, the display electronics has made a determination of the alignment and has populated the "aligned" checkbox. By visually confirming that the independently generated EVS and SVS elements are aligned, the pilot may determine that he can likely trust the data being provided by the joint EVS/SVS scene to a lower altitude prior to obtaining a visual confirmation of the ground or approach lighting system. When the EVS/SVS elements are aligned, the iconic SVS elements may be 'haloed' by the EVS imagery to provide for easy confirmation of alignment. In other embodiments, the iconic SVS elements may be haloed by a pixel color that contrasts with that from EVS output to provide for better contrast of the SVS elements against the EVS imagery.

The construction and arrangement of the systems and methods as shown in the various exemplary embodiments are illustrative only. Although only a few embodiments have been described in detail in this disclosure, many modifications are possible. All such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures may show a specific order of method steps, the order of the steps may differ from what is depicted. Also two or more steps may be performed concurrently or with partial concurrence. Such variations will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for controlling an image displayed on a display unit of an aircraft, the system comprising:
   an enhanced vision system that detects elements of an approach lighting system for display on the display unit;
   a synthetic vision system that uses a database of navigation information and a determined aircraft location to generate synthetic display elements representing the approach lighting system;
   display electronics that cause the detected elements from the enhanced vision system to be simultaneously displayed on the display unit within a same scene as the generated synthetic display elements from the synthetic vision system, whereby the simultaneous display allows a pilot viewing the display unit to check for whether information provided by the enhanced vision system matches information provided by the synthetic vision system, wherein positions of the synthetic vision system elements and an enhanced vision system scene are independently derived such that neither the enhanced vision system scene nor the generated synthetic vision system elements are adjusted in response to information from the other system and neither are adjusted in response to information from a shared source.

2. The system of claim 1, wherein the synthetic vision system is configured to cause its generated synthetic display elements to be positioned on the scene of the display unit based on aircraft position information and aircraft orientation information obtained from a first set of sensors.

3. The system of claim 2, wherein the enhanced vision system is configured to cause its detected elements to be displayed on the scene of the display unit based on information from a second set of sensors.

4. The system of claim 3, wherein the first set of sensors and the second set of sensors do not share any one sensor.

5. The system of claim 4, wherein the generated synthetic display elements are generated using database information corresponding with the aircraft position information and the aircraft orientation information obtained from the first set of sensors;
   wherein the aircraft position information is derived from a satellite-based positioning system;
   wherein the aircraft orientation information is derived from at least one gyroscope system.

6. The system of claim 1, wherein the generated synthetic display elements representing the approach lighting system comprise icons for lights of the approach lighting system.

7. The system of claim 1, wherein the generated synthetic display elements comprise a graphic representing an area of uncertainty around the display element representing the approach lighting system.

8. The system of claim 7, wherein the area of uncertainty is static and represents an area of pre-calculated uncertainty corresponding with information of the synthetic vision system.

9. The system of claim 7, wherein the area of uncertainty is dynamically calculated based on changing factors of the synthetic vision system's electronics.

10. The system of claim 1, wherein the display electronics are configured to cause the detected elements from the enhanced vision system to overlay at least some of the generated synthetic display elements from the synthetic vision system.

11. The system of claim 1, wherein the generated synthetic display elements comprise at least one of: (a) an iconic depiction of the location of the ALS light sources, (b) a graphically drawn runway centerline, (c) a graphically drawn runway outline.

12. The system of claim 11, wherein the display electronics are configured to layer a background image capture from an enhanced vision system sensor below the generated synthetic display elements and to layer the detected elements from the enhanced vision system above the generated synthetic display elements within the scene on the display unit.

13. The system of claim 12, wherein the detected elements from the enhanced vision system are at least partially transparent; and wherein the enhanced vision system enhances the detected elements for display and provides enhanced elements, the enhancement including at least one of sharpening the detected elements and brightening the detected objects.

14. The system of claim 11, wherein the generated synthetic display elements are at least partially transparent.

15. The system of claim 12, further comprising:
a comparator configured to automatically compare the graphical distance between the enhanced elements from the enhanced vision system and the generated synthetic display elements from the synthetic vision system, wherein the comparator is configured to cause an indication of a degree of alignment of the enhanced elements and the corresponding elements on the generated synthetic display to be output.

16. A method for controlling an image displayed on a display unit of an aircraft, comprising:
using an enhanced vision system to detect elements of an approach lighting system for display on a scene of a display unit;
using a synthetic vision system and the synthetic vision system's database of navigation information to generate synthetic display elements representing the approach lighting system; and
causing the detected elements from the enhanced vision system to be simultaneously displayed on the display unit within the same scene as the generated synthetic display elements from the synthetic vision system, wherein positions of the synthetic vision system elements and an enhanced vision system scene are independently derived such that neither the enhanced vision system scene nor the generated synthetic vision system elements are adjusted in response to information from the other system and neither are adjusted in response to information from a shared source.

17. The method of claim 16, wherein the synthetic vision system and the enhanced vision system determine placement of their respective elements on the display unit independently;
wherein the synthetic vision system causes its generated synthetic display elements to be positioned on the scene of the display unit based on aircraft position information and aircraft orientation information obtained from a first set of sensors;
wherein the enhanced vision system is configured to cause its detected elements to be displayed on the scene of the display unit based on information from a second set of sensors.

18. The method of claim 17, further comprising:
using a comparator to automatically compare the graphical distance between the detected elements from the enhanced vision system and the generated synthetic display elements from the synthetic vision system; and
causing an indication of a degree of alignment of the detected elements and the corresponding elements on the generated synthetic display to be output.

19. Non-transitory computer-readable media comprising computer executable instructions for completing the following steps:
using an enhanced vision system to detect elements of an approach lighting system for display on a scene of a display unit;
using a synthetic vision system and the synthetic vision system's database of navigation information to generate synthetic display elements representing the approach lighting system; and
causing the detected elements from the enhanced vision system to be simultaneously displayed on the display unit within the same scene as the generated synthetic display elements from the synthetic vision system, wherein positions of the synthetic vision system elements and an enhanced vision system scene are independently derived such that neither the enhanced vision system scene nor the generated synthetic vision system elements are adjusted in response to information from the other system and neither are adjusted in response to information from a shared source.

* * * * *